Aug. 8, 1961 J. E. GLATT 2,995,172
METHOD AND MEANS FOR JOINING PLASTIC ARTICLES
Filed March 26, 1958
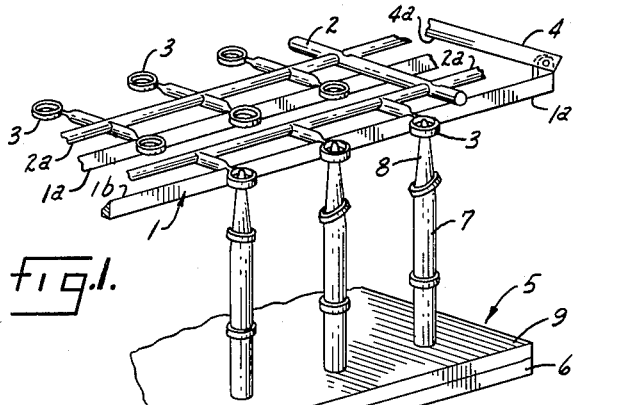
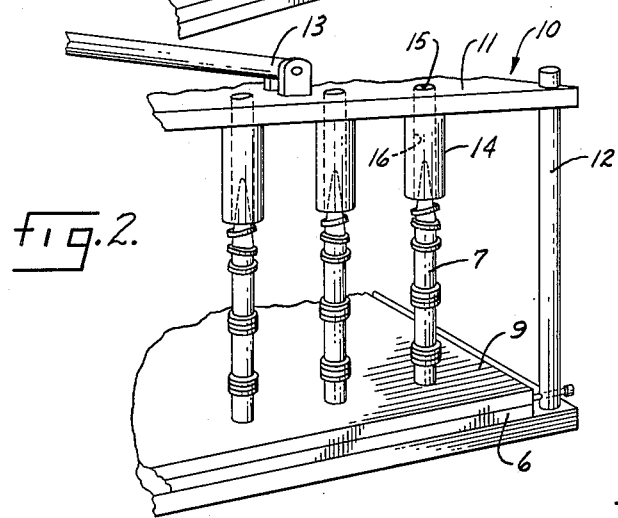
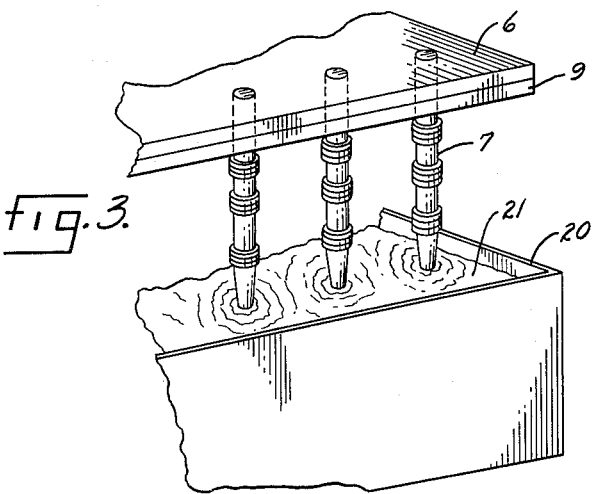
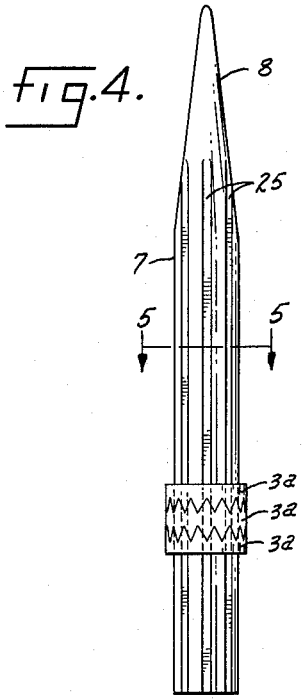
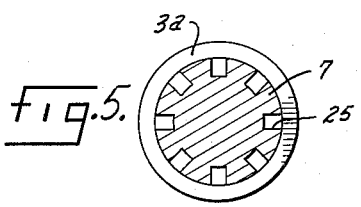
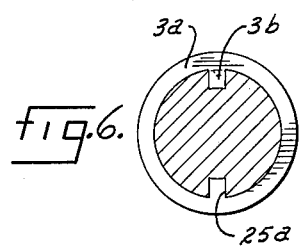
INVENTOR.
JACK E. GLATT
BY
Parker and Carter
ATTORNEYS.

United States Patent Office 2,995,172
Patented Aug. 8, 1961

2,995,172
METHOD AND MEANS FOR JOINING PLASTIC ARTICLES
Jack E. Glatt, Chicago, Ill.
(633 W. Austin St., Park Ridge, Ill.)
Filed Mar. 26, 1958, Ser. No. 724,050
18 Claims. (Cl. 154—1)

This invention relates to a means and method for joining plastic articles and has particular relation to a means and method for expeditiously and economically joining apertured plastic elements.

One purpose of the invention is to achieve a high rate of production of joined plastic articles by the provision of the inventive means and method set forth herein:

Another purpose is to provide a method and means effective to enable employment of a molded "shot" having thereon a large number of the elements to be joined. Where varied colored rings have been joined, for example, in the past, one common method is to select the rings desired and manually position them on the manufactured article with which they are associated and then to paint their outside surfaces with a solvent. It is, accordingly, another purpose of the invention to avoid the time consumption and possibility of error inherent in such methods by providing a rapidly effective means and method of insuring accurate, simultaneous, positioning and joining of plastic articles in substantial volume.

Another purpose is to provide a means and method for joining plastic articles effective to achieve a positive joining of such plastic articles.

Another purpose is to provide a means for automatically and simultaneously aligning and joining plastic articles.

Another purpose is to provide a means and method for joining plastic articles effective to produce such joining with a minimum opportunity for damage or injury to the articles to be joined.

Another purpose is to provide a means and method for joining plastic articles effective to join a plurality of plastic articles varying in number as may be desired.

Other purposes will appear from time to time during the course of the specification and claims.

I illustrate my invention more or less diagrammatically in the accompanying drawings, wherein:

FIGURE 1 is a perspective view illustrating a suitable form of one portion of a structure illustrative of the present invention and one step in the method of the present invention;

FIGURE 2 is a perspective view illustrating a suitable form of another portion of a structure illustrative of the present invention and a further step in the method thereof;

FIGURE 3 is a perspective view illustrating a further step in the method of the present invention;

FIGURE 4 is a detail view illustrating one form of a structural member illustrative of the present invention;

FIGURE 5 is a view taken on the line 5—5 of FIGure 4; and

FIGURE 6 is a detail view in partial cross-section illustrating an additional structural feature of the present invention and a variant step in the method thereof.

Like parts are indicated by like numerals throughout the specification and claims.

Referring now to the drawings, and particularly to FIGURE 1, the numeral 1 generally designates what is known in the trade as a "degating" fixture. The member 1 may comprise for example a support 1a on which a "shot" 2 is supported. The shot 2 comprises a plurality of runners 2a along each of which a plurality of rings or other apertured articles 3 extend, the number of runners and rings or other articles varying as may be desired. The shot 2 is molded in one piece and placed on the support 1a with the upwardly directed knife edges 1a between the rings 3 and the adjacent runner. A severing device which may, for example, comprise a member 4 having movable knife edges 4a is employed in association with the degating fixture 1 to sever the plastic articles 3 from the runner 2.

An article-receiving member is illustrated generally at 5. The member 5 may comprise a base 6 having upstanding therefrom a plurality of rods or pin members 7, the upper or free ends 8 of which are generally conical in form. Slidably received on the members 7 is a remover member 9 which may take the form of a plate.

In FIGURE 2 I illustrate a positioning device, indicated generally at 10. The positioning device may comprise a plate 11 slidably mounted on a support indicated diagrammatically at 12. An operating member, such as the lever 13, may be employed to move the member 11. The member 11 has article-positioning elements 14 positioned thereon. It will be observed that the elements 14 are equal in number to the number of members 7 upstanding from the base 6. Each of the members 14 comprises an apertured or cylindrical tubular element effective to conveniently slidably receive the members 7, and each is aligned with a suitable aperture 15 in the plate 10, the diameters of the apertures 15 corresponding to the diameters of the passages 16 in the elements 14. It will be understood that the members 14 could take a variety of shapes, so long as an element is provided for movement longitudinally of members 7 and positioned to engage articles 3 thereon.

In FIGURE 3 the numeral 20 generally designates a tank or other suitable container for a bath of plastic solvent 21.

Referring now to FIGURE 4 the member 7 is shown as having a plurality of circumferentially spaced, longitudinal grooves 25 formed therein, the grooves 25 extending upwardly to terminate at a point positioned on the conical outer end 8 of the members 7 and extending substantially to the opposite end of the member 7.

FIGURE 5 illustrates an article 3 positioned on the form of rod or pin 7 illustrated in FIGURE 4.

As illustrated in FIGURE 4, the articles 3a may comprise rings having particular conformations on at least one annular edge thereof. For example, the upper ring 3a may have a flat or continuous annular upper edge and a scalloped, toothed or otherwise formed lower edge. The reverse may be true of the bottom ring 3a illustrated in FIGURE 4. The middle ring 3a of FIGURE 4 may have both of its annular edges bearing matching conformations to those of the upper and lower rings 3a.

In FIGURE 6 the ring 3a is shown as having inwardly directed fingers or ears 3b effective to be slidably received in corresponding grooves 25 of the rod 7.

Whereas I have described and claimed a practical and operative device, nevetheless, many changes may be made in the size, shape, number and disposition of parts without departing from the spirit of my invention. For example, whereas I have shown and described ring-like plastic articles, it will be understood that a plurality of plastic article formations may be suitably joined by the means and method of the present invention, it being necessary only that the articles have an aperture permitting reception thereof by a suitable receiver element, or, where the receiver element takes a form such as to receive articles therewithin, the apertures in the articles permit contact of solvent passing therethrough, the inner wall of such receiver members being formed, when desired, to permit contact of solvent with outer surfaces of the articles within such receiver members. Similarly, the positioning means illustrated in FIGURE 2 could take a variety of forms, the invention requiring a means effective to move plastic articles into desired contact position in relation to a plurality of receiver members simultaneously. In the same manner, the remover plate 9 could assume a variety of forms so long as it also were capable of being slidably moved in relation to and to contact a plurality of article-receiving members. The same is true with respect to the receiver member 7, the outer configuration of which may vary in order to frictionally receive and hold the particular plastic articles to be joined. As appears hereinbelow a surface of the members 7 may be grooved to achieve a number of particular advantages. I therefore wish my description and drawings to be taken as in a broad sense, illustrative or diagrammatic, rather than as limiting me to my precise showing.

The use and operation of structural components of my invention may be conveniently described in conjunction with a description of the method of my invention.

The plastic articles 3 are removed by any suitable degating fixture and, as illustrated in the drawings, dropped by gravity onto receiver members 7. Whereas the receiver members 7 are shown as three in number, it will be understood that the number thereof could vary, it being obvious that the larger number of members 7 permit of an even faster rate of production. Similarly, while the members 7 are indicated as upstanding from a plate 6, it will be understood that they could be arranged in other suitable forms. For example, they could be arranged in other suitable forms. For example, they could radially extend from a wheel a variety of supporting structures and be movable individually or in groups into position to receive a flow of plastic articles, each individual member 7 then moving into position to receive a suitable positioning element operative in the manner of member 14, and thereafter movable into a bath such as bath 21, movable remover elements being operatively associated with each member 7 and movable outwardly to slidably remove the members. I find it convenient, however, to illustrate the invention as shown in the drawings herein.

By the same token I illustrate, for convenience, three rings 3 to be joined into unitary elements, each of which comprises the three rings, whereas the number of rings or articles to be joined may obviously vary beyond two without departing from the nature and scope of the invention.

The receiver members 7 are designed to frictionally receive the articels 3 for positioning thereon. The articles 3 are enabled to drop a substantial distance by gravity onto the member 7. Thereafter they must be positioned into the desired groupings and the groupings individually spacedly positioned by an element such as the positioning device illustrated best at 10 in FIGURE 2. It will be understood that the positioning device may be alternately employed in relation to the degating fixture. As shown in FIGURE 2, two sets of three rings each have been positioned on the members 7 and a third set is about to be positioned, the rings of each set being brought into contact one with the other by the element 14.

When a desired number of sets of plastic articles to be joined have been positioned on the receiver members 7, the receiver members, with the articles held frictionally in position thereon, are then dipped into a suitable bath of plastic solvent such as that illustrated at 21. The solvent, upon contacting the material of the rings 3, is effective to cause a joining of the rings 3 along their mating edges.

By providing the fluted receiver member 7 having the grooves 25, as illustrated in FIGURES 4 and 5, I provide a means for the solvent 21 to contact the inner surfaces, as well as the outer surfaces of the articles 3, at the points opposed to the grooves 25.

On occasion it may be desired to join articles having other than smooth or straight mating edges. In such event it is important that the mating edges be brought into correct mating engagement prior to joining the articles. In FIGURE 6 I illustrate, for convenience, a set of two grooves in the pin or rod 7. The articles to be joined are illustrated as rings 3a being formed with integral ears or pins 3b effective to be received within the grooves or flutes 25a The grooves 25a may be widely flared, as illustrated, at their upper extremity in order to insure initial engagement of the ears 3b in the grooves 25a. The engagement of the ears 3b with the grooves 25a is effective to insure the mating of the individual articles as they are moved into engagement one with the other along the receiver 7 and the ears 3b, when necessary, may be removed from articles 3a, after the articles have been joined.

Thus the method of my invention comprises the steps of receiving the articles to be joined on or in a receiver member, positioning and frictionally holding said articles in contact with each other on or in said receiver member, thereafter immersing said receiver element with the articles to be joined positioned and frictionally held thereon or therein in a suitable bath of plastic solvent or otherwise contacting the articles with solvent, removing the receivers and articles from said bath, and thereafter slidably disengaging said articles in their joined state from said receivers.

I claim:

1. The method of joining a plurality of plastic articles which comprises the steps of molding a plurality of said articles in a single shot, sequentially severing said articles from a plurality of said shots, receiving said severed articles on a receiver member, slidably positioning said articles on said receiver member to bring said articles into contact one with the other, frictionally retaining said articles on said receiver member, immersing said receiver member with said articles so positioned and held thereon in a liquid bath of plastic solvent, withdrawing said receiver member with said articles so positioned and held thereon from said bath and thereafter slidably removing said articles, in their joined state, from said receiver member.

2. Means useable in joining plastic articles comprising a receiver element having a plurality of receiver members each formed and adapted to slidably receive and frictionally engage said plastic articles, positioning means slidable axially of each of said receiver members to engage and position plastic articles in relation to said receiver members, and additional article-removing means slidable in the opposite direction axially of said receiver members to remove said articles from said receiver members.

3. Means useable in joining plastic articles having openings therein, comprising a plurality of rod-like elements formed and adapted to receive said members, said receiver elements having a substantially continuous cross-sectional area substantially identical with the area of the apertures in said articles whereby said articles may frictionally engage the outer surface of said receiver members for slidable movement and frictional retention thereon, positioning means slidable in one direction along said receiver members to contact and position said articles thereon, and article-removing means slidable in the opposite direction along said receiver members to contact and remove said articles therefrom.

4. The structure of claim 3 characterized by and including formations in the outer surface of said receiver members effective to create passages between portions of said receiver members and opposed portions of the inner surface of said articles when said articles are positioned on said receiver members.

5. The method of joining plastic articles which comprises the steps of receiving said articles on a receiver member thereafter, positioning said articles in contact with each other on said receiver member, immersing said receiver member with said articles positioned thereon in a liquid bath of plastic solvent removing said receiver member from said bath and removing said articles in their joined state from said receiver member positioning additional plastic articles on said receiver member and thereafter sequently repeating the steps of immersion removal and positioning of additional articles.

6. The method of joining plastic articles which comprises the steps of providing a receiver member, receiving said articles on said receiver member, slidably positioning said articles on said receiver member in contact with each other, frictionally retaining said articles on said receiver member and immersing said receiver member with said articles in a bath of plastic solvent, providing direct access between opposed portions of said receiver member and said article to portions of the inner surfaces of said articles by said solvent while said articles are immersed therein, withdrawing said receiver members and articles from said solvent and thereafter slidably removing said articles from said receiver member.

7. Means for joining plastic articles comprising a plurality of receiver members formed and adapted to slidably receive and frictionally engage said plastic articles, positioning means slidable on one direction axially of said receiver members to position said articles in contact one with the other in frictional engagement with said receiver members, a bath of plastic solvent positioned to receive therein said receiver members with said articles positioned thereon, and article-removing means, slidable in the opposite direction axially of said receiver members and effective to slidably remove said articles from said receiver members.

8. Means for joining plastic articles comprising a receiver member formed and adapted to slidably receive and frictionally engage said articles, positioning means slidable axially of said receiver member to position said articles therealong in contact one with the other, a bath of plastic solvent positioned to receive therein said receiver member with said articles positioned thereon, and article-removing means slidable axially of said receiver member to engage and slidably remove said articles therefrom.

9. The structure of claim 8 characterized by and including conformations on the outer surface of said receiver member effective to permit contact of a liquid with portions of the inner surface of said articles.

10. Means usable in joining plastic rings comprising a plurality of pointed rods having a major diameter substantially equal to the inner diameter of the rings to be joined, ring-positioning means slidable axially of said rods to engage and position rings in contact one with the other on said rods, a bath of plastic solvent positioned to receive therein said rods with said articles thereon, means slidable axially of said rods and positioned to engage said articles to slidably remove the same from said rods in their joined state.

11. The structure of claim 10 characterized by and including conformations on the outer surface of said rods effective to permit access of solvent to the inner surfaces of said rings.

12. The method of joining plastic elements having matching conformations in their mating surfaces which comprises the steps of providing a receiver member having a predetermined configuration in its outer surface, forming on the article to be joined a corresponding conformation effective to mate with the last-named conformation on said receiver member, slidably receiving the articles to be joined on said receiver member and mating said corresponding conformations on said receiver member and said articles to be joined to automatically cause engagement of the mating surfaces on the articles to be joined, immersing said receiver member and said articles to be joined in a bath of plastic solvent, removing said receiver member and articles from said bath, and thereafter removing said articles from said receiver member.

13. Means for joining plastic articles comprising a receiver member for said articles, article-positioning means movable in relation to said receiver member to position said articles thereon in contact one with the other, a bath of plastic solvent positioned to receive therein said receiver member with said articles thereon, and article-removing means movable in relation to said receiver to remove said articles in their joined state therefrom.

14. Means for joining plastic articles comprising a base, a plurality of rod-like members upstanding from and individually spaced on said base, means slidable along said rod-like members toward said base to position articles on said rod-like members for frictional engagement therewith, a bath of plastic solvent positioned to receive said rod-like members therein, and article-removing means slidable along said rod-like members in a direction away from said base to engage and slidably remove said articles from said rod-like members.

15. The method of joining plastic rings which comprises the steps of providing a plurality of pointed rods, positioning said rods in position to receive said rings thereon by gravity, positioning said rings to be joined in contact one with the other on said rods in frictional engagement therewith, dipping said rods with said articles thereon in a bath of plastic solvent, removing said rods with said articles thereon from said bath of plastic solvent and thereafter slidably removing said articles in their joined state from said rods.

16. The method of joining plastic articles which comprises the steps of positioning said articles in individual frictional engagement with a receiver and in contact one with the other, bringing said articles into contact with a plastic solvent while retaining said articles in individual frictional engagement with said receiver and in contact one with the other, and thereafter removing said articles in their joined state from said receiver and thereafter sequently repeating the foregoing steps with additional plastic articles and said receiver.

17. Means for joining a plurality of plastic articles molded in a plurality of plastic shots, including a support for said shot, means for severing said articles from said shots while said shots are supported on said support, receiver members positioned to receive said articles as they are severed and fall from said support and effective to frictionally engage and hold said articles, positioning means movable in relation to said receiver members to engage and position said articles in contact one with the other, a solvent bath positioned to receive said receiver members therein with said articles positioned thereon and remover means movable in relation to said receiver members to engage said articles and remove them from said receiver members.

18. The method of joining plastic articles which comprises the steps of molding a plurality of said articles in a single shot, molding additional similar shots each having therein a plurality of articles to be joined, severing said articles from said shots in predetermined sequence, receiving said severed articles in said sequence on a number of receiver members corresponding to the number of said articles on each of said single shots, positioning each of said articles on said receiver members in contact with the article to be joined thereto, immersing said receiver members and articles in a bath of plastic solvent, removing said receiver members, and articles from said bath and removing said articles in their joined state from said receiver members.

References Cited in the file of this patent

UNITED STATES PATENTS

| | | |
|---|---|---|
| 1,128,036 | Paulero | Feb. 9, 1915 |
| 2,223,871 | Johnson | Dec. 30, 1940 |
| 2,359,575 | Norman et al. | Oct. 3, 1944 |
| 2,384,219 | Vaughn | Sept. 4, 1945 |
| 2,464,781 | Baker | Mar. 22, 1949 |
| 2,537,029 | Cambern | Jan. 9, 1951 |
| 2,619,964 | Thaete | Dec. 2, 1952 |
| 2,788,436 | Young et al. | Apr. 9, 1957 |
| 2,788,834 | Slaughter | Apr. 16, 1957 |
| 2,814,581 | Flynn | Nov. 26, 1957 |

OTHER REFERENCES

Materials in Design Engineering, Manual 145, January 1958, pages 129–131.